United States Patent [19]

Christensen

[11] Patent Number: 5,274,307

[45] Date of Patent: Dec. 28, 1993

[54] SINGLE IC FOR CRT DISPLAY CONTROL WAVEFORM GENERATION

[75] Inventor: Steven B. Christensen, Glenview, Ill.

[73] Assignee: Zenith Electronics Corporation, Glenview, Ill.

[21] Appl. No.: 745,632

[22] Filed: Aug. 15, 1991

[51] Int. Cl.$^5$ ........................ H01J 29/70; H01J 29/76
[52] U.S. Cl. ................................................. 315/368.13
[58] Field of Search ................................... 315/368.13

[56] References Cited

U.S. PATENT DOCUMENTS

| | | | |
|---|---|---|---|
| 4,203,051 | 5/1980 | Hallett et al. | 315/13 |
| 4,354,143 | 10/1982 | Judd | 315/368 |
| 4,422,019 | 12/1983 | Meyer | 315/368 |
| 4,680,510 | 7/1987 | Spieth et al. | 315/368 |
| 4,687,973 | 8/1987 | Holmes et al. | 315/371 |
| 4,871,948 | 10/1989 | Nelson | 315/368 |

*Primary Examiner*—Theodore M. Blum
*Attorney, Agent, or Firm*—Roland W. Norris

[57] ABSTRACT

A single IC chip, eight channel, correction waveform generator for CRT displays is disclosed. Each channel may output a different waveform to correct a different form of raster distortion. A correction waveform is developed for each type of display distortion. For each correction waveform eight correction waveform segments spaced over the vertical scan cycle are then selected and nine values on each waveform segment are digitally stored in the chip for each channel. The chip generates a corrective waveform segment per channel for each horizontal scan line in the display by serially horizontally interpolating values for the intervals between the selected nine values. This horizontal interpolation uses weighted sum equations applied to the closest four known waveform segment values around the interval to produce interpolated values lying on curves between the selected values. In order to obtain known waveform values for horizontal scan lines not having selected and stored waveform values corresponding thereto, linear vertical interpolation is performed to supply the known values for horizontal interpolation. Careful selection of numerical weights in the weighted sums equations, and the need for few known values to solve the interpolation equations, lead to reduced hardware requirements within the IC. Great control over CRT display correction is thus obtained with a minimal number of specified correction values.

21 Claims, 4 Drawing Sheets

SINGLE IC FOR CRT DISPLAY CONTROL WAVEFORM GENERATION

BACKGROUND OF THE INVENTION

1. Field of the Invention

The present invention relates generally to CRT display control. The present invention relates more specifically to digitally stored waveform parameters which are used to generate analog waveforms for correcting CRT display distortions.

2. Discussion of the Related Art

A CRT display, or raster, is produced by scanning an electron beam or beams over a phosphor screen. The beams are produced and focused by an electron gun and scanned over the the screen by changing electromagnetic fields. Various factors inherent in the operational CRT can cause geometric distortions of the scanned raster. Also, in the case of color CRTs, the beams may not land solely on their intended phosphor target areas, resulting in display color distortion. It is well known in the art that these distortions must be compensated to produce the intended display.

Ultimately, the necessary compensation or correction, must be induced into the operational CRT in the form of analog waveforms to drive the correction circuitry. Hereafter, it is assumed for explanatory purposes that there is one waveform per distortion type whose period equals the vertical period, i.e. the time needed to produce one raster.

With the advent of digital electronics it has become possible to digitally store a limited number of arbitrary waveform values and interpolate remaining waveform values. This method gives a great degree of control over the correction waveform desired.

Past schemes have utilized linear interpolation to interpolate the remaining waveform values. However, this places the interpolated values on a straight line between the stored, or known, values. However, the correction waveforms desired usually need to vary in a smooth fashion. In this case, a more sophisticated interpolation scheme is needed, which leads to a more true reproduction of the desired analog correction waveform from the interpolated values. If one is to construct a curve from a series of points using linear interpolation, one must utilize more small straight lines the closer one wishes to approximate the curve. Thus, in linear interpolation the number of stored values, representing the end points of the straight lines, must be increased, the closer the reproduction of the waveform becomes to the desired curve. Alternatively, complex equations such as cubic spline functions may be used to interpolate the desired waveform curves from a field containing a lesser number of stored values. However, to perform the complex equations in the time frame of CRT operations, massive computing power is needed.

The known circuits generally propose one or both of these schemes, either of which lead to hardware complexity and expense. Ideally then, a digitally formatted display control would utilize a very limited amount of stored correction waveform values manipulated by simply performed equations within the time frame of CRT operations. The desirable hardware configuration within the CRT cabinet is a single IC which can generate correction waveforms to correct a variety of distortion problems in an efficient and cost effective manner.

References which may be of interest include U.S. Pat. Nos.:
4,203,051
4,354,143
4,422,019
4,680,510
4,687,973
4,871,948

OBJECTS OF THE INVENTION

It is an object of the invention to provide an IC which can correct a variety of distortions in a CRT display in an efficient and cost effective manner.

It is a further object to provide arbitrary control over the correction waveforms generated while providing smoothly varying correction information to the CRT circuitry.

It is a further object to provide an IC having a limited number of stored correction values from which are interpolated waveform values that are subsequently converted to a correction waveform for the entire raster of a CRT.

DESCRIPTION OF THE PREFERRED EMBODIMENTS IN GENERAL

Figure 1:
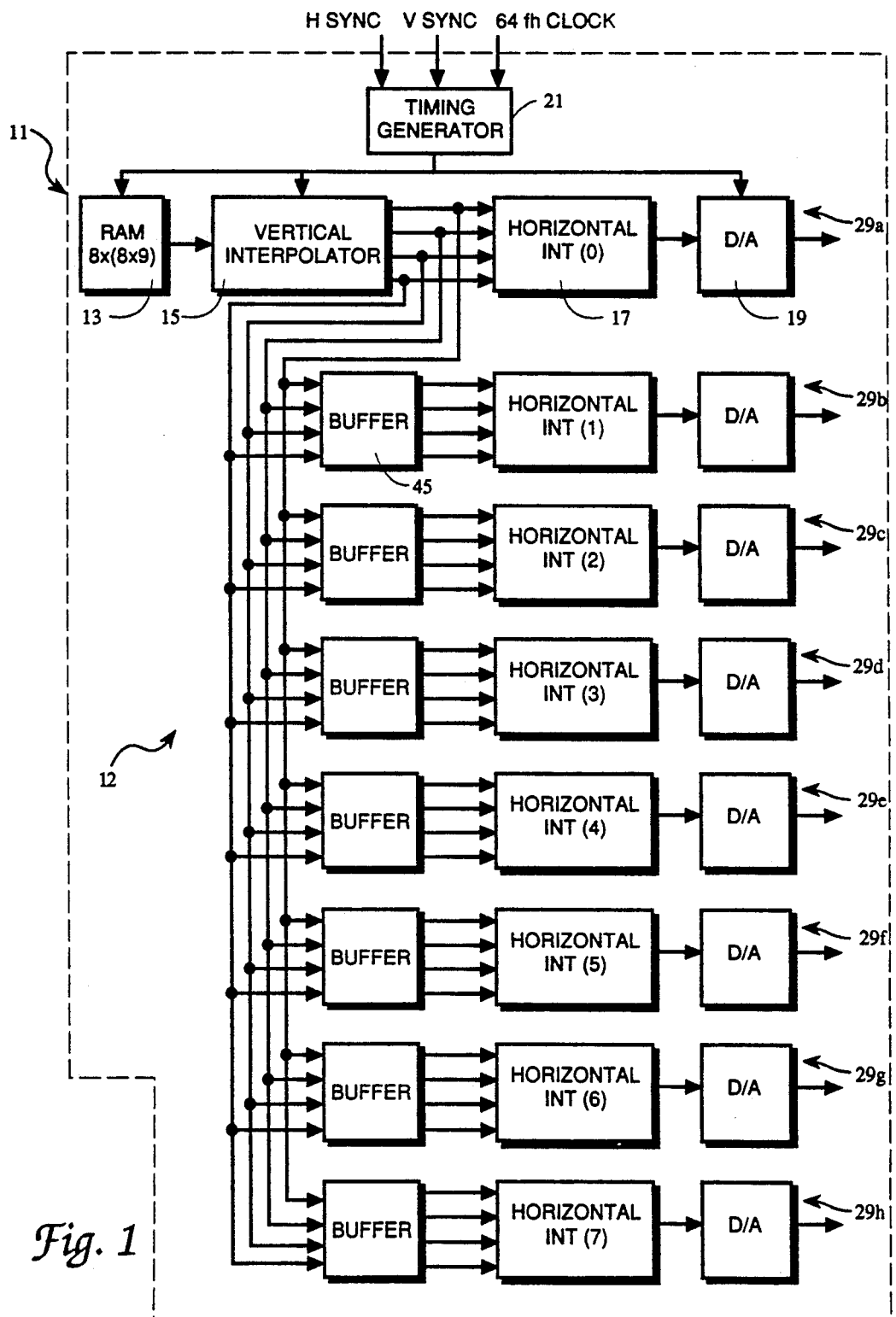
FIG. 1 is a block diagram of the preferred embodiment of the present invention.

As seen in FIG. 1, the present invention comprises an eight channel waveform generator 12 fabricated in the form of a single IC 11 adapted for CRT display control. Waveform generator 12 comprises a data memory 13, a vertical interpolator 15, eight horizontal interpolators 17, and eight digital-to-analog converters (DAC) 19. A timing generator 21 for generating control pulses is further included for proper operation of the IC 11.

As the internal operation of each channel 29a-h is identical, only one channel of the waveform generator 12 will hereinafter be discussed unless otherwise indicated.

The function of each channel in the waveform generator is to generate from digitally stored waveform segments a smoothly varying correction waveform for application to correction circuitry to correct distortion in the video display. For example, six channels may be used for dynamic color convergence correction, one channel for dynamic focus and one for North-South pincushion correction. In brief, the data memory 13 digitally stores one field, or matrix 14 (FIG. 3A), of values of the correction waveform for each channel 29a-h used to correct a particular geometric distortion of the display. Each matrix is arranged in eight rows of nine values. The rows are spaced substantially equally apart throughout the time span of a vertical scan cycle. The nine values on a row divide the row into eight time intervals. Each row corresponds to a segment of the correction waveform which in turn corresponds to a horizontal scan line of the raster. Thus, it will be appreciated that:

1) A correction waveform has a period equal to the vertical scan period,

2) A waveform segment has a period equal to one horizontal scan period and,

3) An interval is an arbitrary portion of a segment, in the preferred embodiment there are eight intervals per segment.

Figure 3:
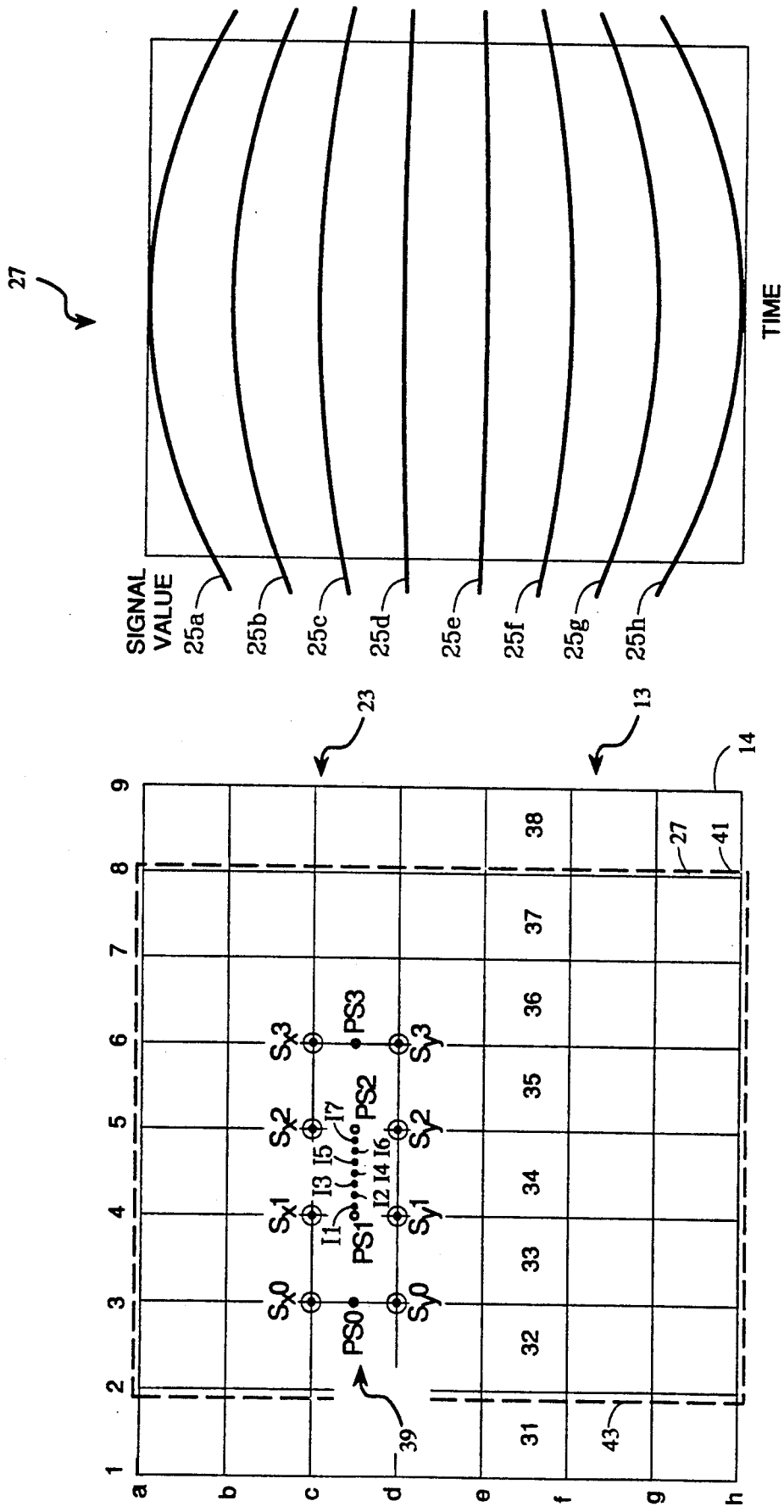
FIG. 3A is a representation of a waveform correction value matrix superimposed on a CRT raster.
FIG. 3B is a representation of segments of the analog correction waveform represented by the matrix of FIG. 3A superimposed on a CRT raster.

As seen in FIG. 3A, the rows $a$–$h$ intersect columns 1–9. At the intersection of the rows and columns lie the stored correction values. The stored rows, columns and values are sometimes coloquially referred to herein as the spline rows and columns and points, respectively. The horizontal and vertical interpolators 17, 15, respectively, take the stored matrix values, or spline points, and operate mathematically to produce values for segments of a correction waveform which correspond to every horizontal scan line in the CRT raster. These correction waveform segment values are converted to an analog waveform by the DAC 19 and output from the IC 11. The horizontal interpolator 17 takes the four closest segment values to an interval and interpolates a smooth curve for that interval by a weighted sum calculation. The vertical interpolator 15 linearly interpolates between stored rows to produce a new set of values for the current scan line when values for horizontal scan lines are not stored in the data memory. These vertically interpolated values are then used by the horizontal interpolator.

Figure 2:
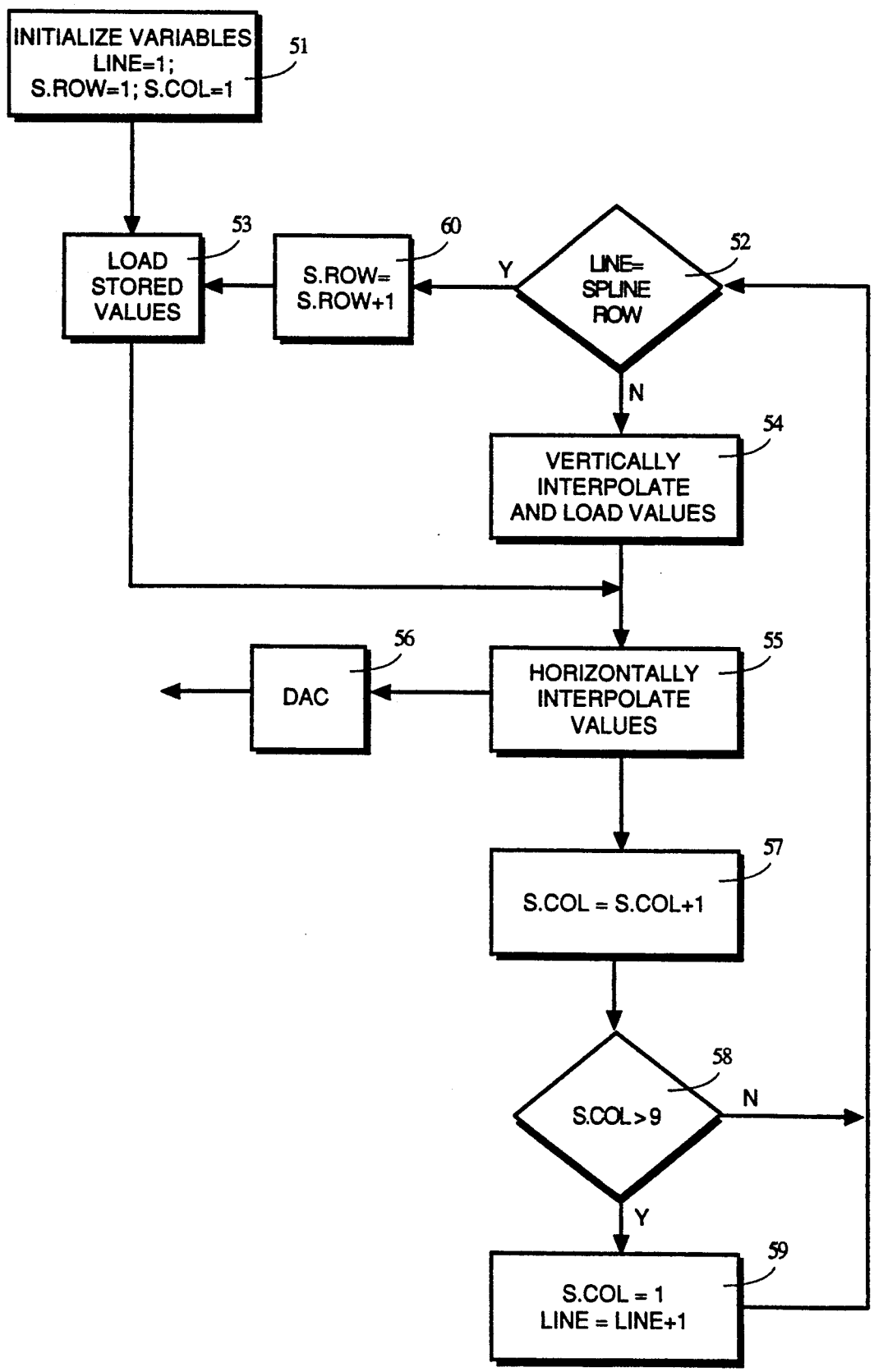
FIG. 2 is a block diagram of the interpolation sequence for one display field in the preferred embodiment.

As seen in FIG. 2, the operational sequence may be briefly described as follows. FIG. 3A may be referenced for understanding of spline row and columnar placement of known correction values. At block 51 the raster horizontal scan line is identified as the first line and the column starting the interval in which the horizontal interpolation is to take place is identified as the first column. The spline row is identified as row number one. At block 52, the scan line is either identified as having a corresponding selected and digitally stored correction waveform segment, or spline row, or as having no corresponding spline row. As per block 53, if a corresponding spline row is present in the chip memory the waveform values necessary for horizontal interpolation in the subsequent interval are retrieved and sent to the horizontal interpolator. If however, as per block 54, the scan line is one with no corresponding spline row, the waveform values necessary for horizontal interpolation must be derived from vertical interpolation and then sent on to the horizontal interpolator. As per block 55, the horizontal interpolator will then interpolate values being on a curve in the interval between the first two known values, i.e., between columns one and two. As per block 56 the waveform values for the first interval are output to the DAC. As per block 57, the column count is advanced one to identify the next interval for which horizontal interpolation will take place. In the preferred embodiment there are nine columns of values. Accordingly, as per block 58, if the column count is less than or equal to nine, the known values for interpolation in the interval are obtained and the horizontal interpolation serially repeats until the correction waveform segment is generated for the entire horizontal scan line. As per block 59, once the column count exceeds nine, the scan line count is advanced and the column count reset to begin interpolating values for the next scan line correction waveform segment. As per block 60, the spline row count is advanced when the horizontal scan line count reaches the next succeeding spline row.

In Detail

As known in the art, individual CRT displays are normally tested at the factory for display distortion and a suitable set of correction waveforms are developed for the individual display. These waveforms can be digitized and selected values therefrom stored for use with the present invention.

The memory 13 stores eight channels 29 $a$–$h$ of digitized correction waveform values. Referring to FIG. 3A, the correction values for the channel are stored in a format best visualized as a nine column 1–9, eight row $a$–$h$ matrix 23 of values representing eight correction analog wave form segments 25$a$–$h$ (FIG. 3B) for controlling eight horizontal scan lines in the CRT display, or raster, 27. The specified rows and columns will be referred to, coloquially, as spline rows and spline columns. Points where they intersect will be referred to as spline points. Each of the eight separate correction waveform channels 29$a$–$h$, or outputs (FIG. 1), has its own specified matrix 23 provided for in the memory 13.

Of course, considering the width of raster 27, nine data values do not make for a smooth analog wave when fed through the DAC 19. Therefore, the nine data values or spline points must have intermediate data values interpolated in the intervals therebetween to produce a smooth analog wave 25$a$–$h$ for each row. This interpolation will be referred to as horizontal interpolation. Also, a CRT raster 27 is composed of many more horizontal scan lines, e.g. 640, than the eight waveform segments represented by the eight spline rows $a$–$h$ specified in the matrix 23. Thus data values must be interpolated in each spline column for each horizontal scan line not directly represented by the spline rows $a$–$h$. In the example of 640 scan lines, 632 values would be interpolated as needed from the given spline values in each column 1–9. This interpolation will be referred to as vertical interpolation, and supplies the required horizontal values for the horizontal interpolation function on each non-spline row.

Three interpolated points I2, I4, I6 for each interval 31–38 in a row are derived in the IC 11 from the known or spline values by a horizontal interpolator function which is a linear equation using weighted sums. The horizontal interpolator function values have been chosen such that this calculation may be performed more simply than, for example, a cubic spline function and thus more quickly in shift and add registers in the horizontal interpolator 17. The calculations are performed at a higher speed than the horizontal scanning frequency (fh) of the raster so that the analog correction waveforms are output in real time.

More specifically now with regard to FIG. 3A, it is seen that each spline row $a$–$h$ corresponds in time to a horizontal scan cycle of the CRT display. The spline columns 1–9 divide the scan cycle into eight time intervals 31–38. The values at beginning and end spline columns 1 and 9, respectively, do not occur during, or in, the CRT raster 27, but instead occur during retrace of the horizontal scan from the right edge 41 of the raster 27 to left edge 43 of the raster to start a new scan line. Thus only six waveform segment intervals 32–37 occur entirely on the raster 27 while the beginning and end waveform segment intervals 31, 38 occur only briefly at the left and right edges 43, 41 of the raster.

Figure 4:
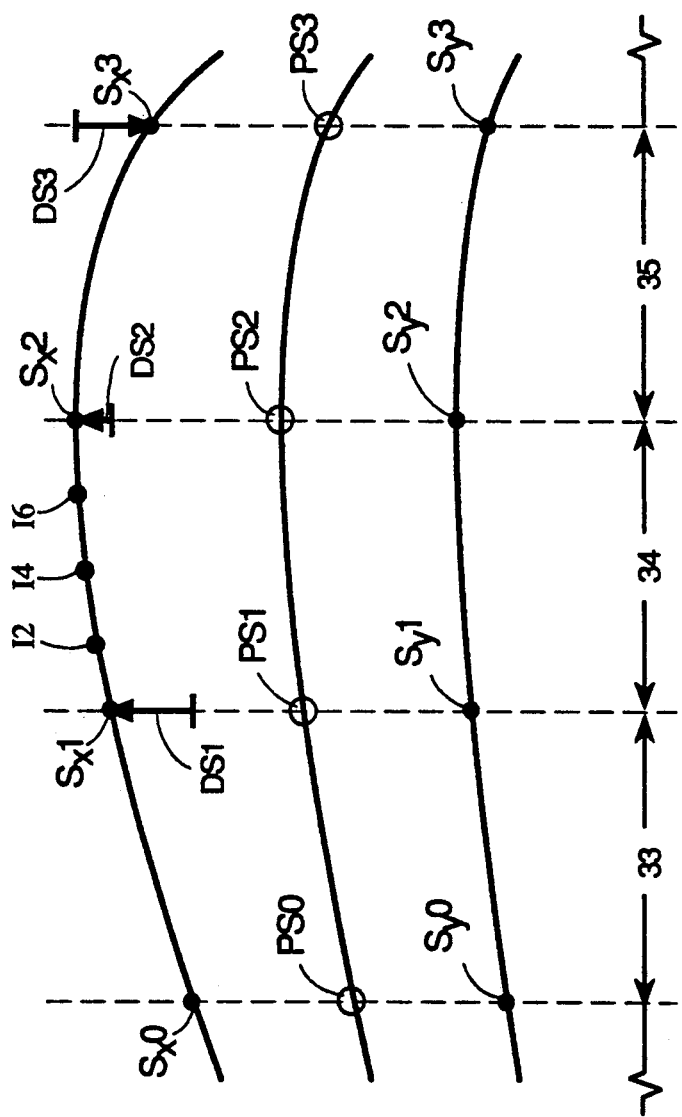
FIG. 4 is a detailed look at a section of the correction value matrix utilizing analog representation of correction waveform segments for explanatory purposes.

As seen in detail in FIG. 4, in the preferred embodiment, horizontal interpolation is performed to derive three Interpolated waveform correction values I2, I4, I6 by a weighted sums function, between each two spline points, e.g. interval 34, using four specified spline values on that row, Sx0 through Sx3. The weighted sums function has been selected to be readily accomplished in digital hardware with the minimum number of shifts and adds, as further explained below. The I2,I4,I6 equations for the three horizontally interpolated values are:

| | |
|---|---|
| I4 = | $(-2S0 + 18S1 + 18S2 - 2S3)/32$, where I4 is the interpolated value midway in the interval between the two spline points defining the interval, |
| S1 = | the first spline point value in the interval, |
| S0 = | the spline point value before S1, |
| S2 = | the second spline point value in the interval, and |
| S3 = | the spline point value after S2. |

I2 and I6 which are equidistant between I4 and the spline points S1 and S2 respectively, are calculated as follows:

$$I2 = (-2S0 + 27S1 + 8S2 - S3)/32$$

$$I6 = (-S0 + 8S1 + 27S2 - 2S3)/32.$$

It will be appreciated that the weights in the numerator are integers which add up to equal the value of the denominator, which is an integral power of two. Digital manipulation of the weighted sum equations is thus easily carried out with a minimum of hardware. The weights in the numerator were empirically derived to provide a smooth curve through the interval based on the location of the four surrounding spline points.

The beginning correction value of the waveform segment for the interval 34 is specified by the value of S1. Therefore, at the end of the weighted sums horizontal interpolations four waveform values are present for the interval 34: S1, I2, I4, and I6. To provide further smoothing, averaging may be used between S1, I2, I4, I6 and S2 to derive I1, I3, I5 and I7 values between the pairs of present values.

With reference to FIG. 3A, vertical interpolation, as explained below, must take place to derive initial correction values for those waveform segments, e.g. 39, which are not spline rows in order to provide the horizontal interpolator with specified correction values analogous to the spline points necessary to determine I2, I4 and I6. Hence, "pseudo splines" must be created for these waveform segments without true splines, e.g. 39.

A linear interpolation function serves to derive pseudo spline points PS0-PS3 in the required spline columns between the given true splines for the non-spline row 39. The vertical interpolation function may be written:

$$PS(J) = Sx0 + J((Sy0 - Sx0)/N), \text{ for } 1 \leq J \leq N-1,$$

where J = the ordinal number of the pseudo spline between Sx0 and Sy0 and N = (number of active scan lines − 1)/7.

Because N is a constant for a given video format, it can be calculated at system start up for multisync monitors and written to the interpolation hardware.

With the necessary pseudo splines PS0-PS3 calculated, the correction values I2, I4, I6 for the chosen interval 34 may then be horizontally interpolated in the manner shown above. Note that for the next interval 35, the first three pseudo splines P0-P2 have already been calculated as PS1-PS3 for the previous interval and thus only the new PS3 for interval 35 need be figured.

Alternatively the horizontal interpolation may be performed using less complex functions by using the differences between spline values rather than the actual values themselves, leading to a more efficient hardware implementation.

As per above, the horizontal interpolation formulas for I2, I4 and I6 were as follows:

$$I2 = (-2S0 + 27S1 + 8S2 - S3)/32$$

$$I4 = (-2S0 + 18S1 + 18S2 - 2S3)/32$$

$$I6 = (-S0 + 8S1 + 27S2 - 2S3)/32$$

Now, if we apply some algebra to the above equations, we get:

$$I2 = ((-2(S0 - S1) + 8(S2 - S1) - (S3 - S1))/32) + S1,$$

$$I4 = ((-2(S0 - S1) + 18(S2 - S1) - 2(S3 - S1))/32) + S1, \text{ and}$$

$$I6 = ((-(S0 - S1) + 27(S2 - S1) - 2(S3 - S1))/32) + S1$$

Now, thinking in terms of the differences in values between the spline points, we define the following values, as seen in FIG. 4:

$$DS1 = S1 - S0,$$

$$DS2 = S2 - S1, \text{ and}$$

$$DS3 = S3 - S2.$$

Substituting these into the above equations, we get:

$$I2 = ((2(DS1) + 8(DS2) - (DS2 + DS3))/32) + S1,$$

$$I4 = ((2(DS1) + 18(DS2) - 2(DS2 + DS3))/32) + S1, \text{ and}$$

$$I6 = (((DS1) + 27(DS2) - 2(DS2 + DS3))/32) + S1,$$

Simplifying, we get:

$$I2 = ((2DS1 + 7DS2 - DS3)/32) + S1,$$

$$I4 = ((2DS1 + 16DS2 - 2 DS3)/32) + S1, \text{ and}$$

$$I6 = ((DS1 + 25 DS2 - 2DS3)/32) + S1.$$

Now let us evaluate the differences between adjacent correction points:

$$I1 - S1 = DX1 = (2DS1 + 7DS2 - DS3)/32$$

$$I4 - I2 = DX2 = (9DS2 - DS3)/32$$

$$I6 - I4 = DX3 = (-DS1 + 9DS2)/32$$

$$S2 - I6 = DX4 = (-DS1 + 7DS2 + 2DS3)/32$$

Note that the weight of DS2 is now either one less than or one greater than 8DS2 and that term can be solved easily with a single hardware block on the IC 11. So, if we start with a knowledge of S1 (the base) and all the DS values (the deltas) we may compute:

$$DX = (2\, DS1 + 7DS2 - DS33)/32$$

$$I2 = S1 + DX1$$

$$DX2 = (9DS2 - DS3)/32$$

$$I4 = I2 + DX2$$

$$DX3 = (-DS1 + 9DS2)/32$$

$$I6 = I4 + DX3$$

$$DX4 = (-DS1 + 7DS2 + 2DS3)/32$$

$$S2 = I6 + DX4$$

Note that in the very last equation S2 is calculated, rather than being a given. Thus with this scheme, the value of the first spline point is known, as well as the change in value from spline point to spline point for the rest of the spline points. The output of this interpolation is simply the sum of the base value and the accumulated DX's.

Thus, it is seen that if the horizontal interpolator is allowed to translate the differences in spline values into differences in all the correction values, the complexity of the equations involved is reduced considerably.

By utilizing a 64fh (fh=horizontal frequency) timing clock, all 64 horizontal scan correction values for a correction row (8 values X 8 intervals) may be output in real time during a single horizontal scan cycle of the raster.

Referring to FIG. 1 and the operation of all eight channels 29a-h in the IC11, the vertical interpolator 15 needs to supply the proper set of four spline or pseudo spline values to each channel horizontal interpolator 17 at the beginning of each interval in the horizontal scan cycle. Because there are eight 64fh clock pulses in each interval and eight channels to be supplied during each interval, the vertical interpolator will update the spline or pseudo spline values to each channel serially, one channel per clock pulse. Buffers 45 are supplied to the last seven channels 29b-h to hold the updated set of spline or pseudo spline values supplied by the vertical integrator 15 so that all eight horizontal interpolators 17 receive updated value sets at the same time, ie, the beginning of each interval. Horizontal and vertical synchronization signals for the CRT display are input to the timing generator 21 of the IC 11 to synchronize the operation of the IC11 and the output of its correction waveforms with the corresponding horizontal scan cycle of the CRT raster.

While particular embodiments of the invention have been shown and described, it will be obvious to those skilled in the art that changes and modifications may be made without departing from the invention in its broader aspects. Therefore, the appended claims are intended to cover all such changes and modifications as fall within the true spirit and scope of the invention. The matter set forth in the foregoing description and accompanying drawings is offered by way of illustration only and not as a limitation on the scope of the invention. The actual scope of the invention is intended to be defined in the following claims.

Having thus described the invention, what is claimed is:

1. In a digital waveform generation method for controlling CRT display distortion comprising:
   a) formulating a correction waveform as necessary to correct a distortion pattern in a CRT raster;
   b) selecting a limited number of segments of the correction waveform spaced in time over the vertical scan cycle of the raster, each segment corresponding to a horizontal scan lines of the CRT raster;
   c) storing digital values representing a limited and equal number of points on each of the limited number of selected correction waveform segments; the stored digital values thereby defining intervals of the selected segments;
   d) horizontally interpolating values lying on a curve in the intervals between the stored digital values;
   e) vertically interpolating values, between the stored digital values, to obtain known values representing additional correction waveform segments corresponding to horizontal scan lines of the CRT raster, the vertically interpolated values defining intervals on the additional waveform segments;
   f) horizontally interpolating values lying on curves in the intervals between the known vertically interpolated values; and,
   g) substantially recreating the correction waveform of part (a) by converting the digital values as developed in parts (c)-(f) to an analog waveform.

2. The method of claim 1;
wherein part (b) further comprises:
selecting only eight correction waveform segments.

3. The method of claim 1;
wherein part (c) further comprises:
storing only nine digital values for representing each selected correction waveform segment.

4. The method of claim 3 wherein the nine stored digital values separate the represented waveform segment into eight intervals, with six of the intervals corresponding to a horizontal scan line and two of the intervals corresponding at least in part to horizontal retrace.

5. The method of claim 1 further comprising:
processing horizontal and vertical CRT synchronization signals, and
processing a timing signal whose frequency is the CRT display horizontal frequency times an integral power of two, in order to control the interpolation sequences.

6. The method of claim 5 including,
storing a plurality of different correction waveform types for correcting different types of display distortion in the memory means thereby enabling the output of more than one correction waveform segment for a given horizontal scan cycle.

7. The method of claim 6 including:
providing a single IC to perform the functions of processing, storing, interpolating, and converting.

8. The method of claim 6 wherein,
the number of different correction waveform types is eight.

9. The method of claim 8 wherein,
the timing signal is sixty-four times the horizontal frequency.

10. The method of claim 1 wherein,
the total number of correction waveform segments is equal to the total number of horizontal scan lines in the CRT raster.

11. The method of claim 1 wherein parts (d) and (f) further comprise:

horizontally interpolating by performing weighted sums equations.

12. The method of claim 11 wherein:
the weighted sums equations use only the closest four known segment values to the interval for interpolation of values within the interval.

13. The method of claim 11 further comprising:
deriving further values in each row between the interpolated values by averaging the interpolated values.

14. The method of claim 11 further comprising:
providing a single IC to perform the functions of storing, interpolating and converting.

15. The method of claim 11 wherein,
the weighted sum equations have a numerator and denominator; the numerator having variables, the values of which are the known waveform segment values, the variables having whole integer weight multipliers applied thereto, the sum of the whole integer multipliers being equal to an integral power of two; and,
the denominator being equal to an integral power of two.

16. The method of claim 15 wherein,
the total of the numerator weights is equal to the denominator.

17. The method of claim 16 wherein the weighted sums equations include:

$$I(4) = -S(0) + 9S(1) + 9S(2) - S(3)/16,$$

where I(4) is an interpolated value at a point midway between two known waveform values,
S(1) is the first stored or known waveform value,
S(2) is the second stored or known wave form value,
S(0) is the stored or known waveform value preceding S(1); and
S(3) is the stored or known waveform value following S(2).

18. The method of claim 17 wherein the equations include:

$$I(2) = -2S(0) + 27S(1) + 8S(2) - S(3)/32;$$

where I(2) is an interpolated waveform value at a point midway between I(4) and S(1).

19. The method of claim 18 wherein the equations include:

$$I(6) = -S(0) + 8S(1) + 27S(2) - 2S(3)/32;$$

where I(6) is an interpolated waveform value at a point midway between I(4) and S(2).

20. The method of claim 11 wherein:
the weighted sums equations have a numerator and a denominator, the numerator having variables, the values of which are derived from the differences in the known values, the variables having whole integer weight multipliers applied thereto, the sum of the whole integer multipliers being equal to an integral power of two; and
the denominator being equal to an integral power of two.

21. The method of claim 20 further comprising interpolating at least three correction waveform values, I2, I4 and I6 by use of the formulae:

$$DX1 = (2DS1 + 7DS2 - DS3)/32$$

$$I2 = S1 + DX1$$

$$DX2 = (9DS2 - DS3)/32$$

$$I4 = I2 + DX2$$

$$DX3 = (-DS1 + 9DS2)/32$$

$$I6 = I4 + DX3$$

$$DX4 = (-DS1 + 7DS2 + 2DS3)/32$$

$$S2 = I6 + DX4$$

where S1 is the first stored or known waveform value,
S2 is the second stored or known waveform value,
S0 is the stored or known waveform value preceding S1,
S3 is the stored or known waveform value following S2; and,
DS1 = S1 - S0,
DS2 = S2 - S1, and,
DS3 = S3 - S2; and,
I4 is an interpolated value at a point midway between the two known waveform values S1 and S2,
I2 is an interpolated value at a point midway between I4 and S1, and
I6 is an interpolated value at a point midway between I4 and S2.

* * * * *